(12) United States Patent
Yoshida

(10) Patent No.: US 10,328,864 B2
(45) Date of Patent: Jun. 25, 2019

(54) STORAGE BOX

(71) Applicant: TOYOTA JIDOSHA KABUSHIKI KAISHA, Toyota-shi, Aichi-ken (JP)

(72) Inventor: Keigo Yoshida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 15/802,709

(22) Filed: Nov. 3, 2017

(65) Prior Publication Data

US 2018/0126918 A1 May 10, 2018

(30) Foreign Application Priority Data

Nov. 9, 2016 (JP) .................................. 2016-219248

(51) Int. Cl.
*B60R 11/00* (2006.01)
*B60N 3/10* (2006.01)
*B60R 7/04* (2006.01)

(52) U.S. Cl.
CPC .............. *B60R 11/00* (2013.01); *B60N 3/101* (2013.01); *B60R 7/04* (2013.01); *B60R 2011/0007* (2013.01)

(58) Field of Classification Search
CPC ... B60R 11/00; B60R 7/04; B60R 2011/0007; B60N 3/101
USPC ..................................................... 296/24.34
See application file for complete search history.

(56) References Cited

U.S. PATENT DOCUMENTS

| | | | | |
|---|---|---|---|---|
| 6,921,118 | B2* | 7/2005 | Clark | B60N 3/102 296/24.34 |
| 10,106,093 | B2* | 10/2018 | Murray | B60R 7/02 |
| 2005/0269919 | A1* | 12/2005 | Sambommatsu | B60N 3/102 312/319.5 |
| 2006/0017359 | A1* | 1/2006 | Sato | A47B 88/467 312/333 |
| 2006/0288101 | A1* | 12/2006 | Mastrodonato | H04L 67/125 709/224 |
| 2010/0078954 | A1* | 4/2010 | Liu | B60N 3/101 296/24.34 |
| 2016/0362029 | A1* | 12/2016 | Masatsugu | B60N 3/102 |

FOREIGN PATENT DOCUMENTS

JP  2008-037147 A  2/2008

* cited by examiner

*Primary Examiner* — Pinel E Romain
(74) *Attorney, Agent, or Firm* — Oliff PLC

(57) ABSTRACT

A storage box includes a case, a moving body, and slide mechanisms guiding relative movement of the moving body. The slide mechanisms include fixed rails disposed in the case, and moving rails disposed in the moving body. The moving rail includes a first projection and a second projection apart from each other in a movement direction of the moving body. The first projection and the second projection are apart from each other when seen in the movement direction. The fixed rail includes: a third projection and a fifth projection that respectively come into contact with the first projection and the second projection at a time when the moving body is located at a first position; and a fourth projection and a sixth projection that respectively come into contact with the first projection and the second projection at a time when the moving body is located at a second position.

8 Claims, 8 Drawing Sheets

STORAGE BOX

INCORPORATION BY REFERENCE

The disclosure of Japanese Patent Application No. 2016-219248 filed on Nov. 9, 2016 including the specification, drawings and abstract is incorporated herein by reference in its entirety.

BACKGROUND

1. Technical Field

The disclosure relates to a storage box that is mounted on a vehicle.

2. Description of Related Art

As shown in FIG. 14, a storage box described in Japanese Patent Application Publication No. 2008-37147 (JP 2008-37147 A) includes: a case 100; a drawer section 110 arranged in the case 100; and a slide mechanism 120 that guides sliding of the drawer section 110 out of the case 100. The case 100 is configured by including: a lower wall 101 in a parallelepiped plate shape; a lateral wall 102 that is vertically provided from a peripheral edge of the lower wall 101; and an upper wall 103 that couples an upper end of the lateral wall 102. The lateral wall 102 is not vertically provided from one side of the peripheral edge of the lower wall 101, and the case 100 is formed in a parallelepiped box shape that is opened laterally. The drawer section 110 has: a bottom wall 111 in a parallelepiped plate shape; and a peripheral wall 112 that is vertically provided from a peripheral edge of the bottom wall 111, and is formed in a parallelepiped box shape that is opened upward. The slide mechanism 120 has: a fixed rail 121 including paired rails; and a moving rail 125 arranged between the paired rails of the fixed rail 121. One end of each of the paired rails in the fixed rail 121 is coupled to the lateral wall 102 of the case 100. In addition, one end of the moving rail 125 is coupled to the peripheral wall 112 of the drawer section 110.

As shown in FIG. 15, in the fixed rail 121, the rail that is located above is referred to as an upper rail 122, and the rail that is located below is referred to as a lower rail 123. The upper rail 122 and the lower rail 123 each extend in a movement direction of the drawer section 110 (a horizontal direction in FIG. 15) and are arranged to be separated from each other by a specified distance. In the upper rail 122, an opposing surface 124 on the lower rail 123 side is provided with: a first projection 122A that is projected to the lower rail 123 side (downward in FIG. 15) from one end in the movement direction (a right end in FIG. 15); and a second projection 122B that is projected from the other end in the movement direction (a left end in FIG. 15) to the lower rail 123 side. In addition, the opposing surface 124 of the upper rail 122 is provided with a third projection 122C that is projected from a portion on the one end side from a center thereof to the lower rail 123 side.

The moving rail 125 is arranged in a state of being placed on the lower rail 123. In the moving rail 125, a moving surface 126 on the upper rail 122 side is provided with: a fourth projection 125A that is projected to the upper rail 122 side (upward in FIG. 15) from one end in the movement direction (a right end in FIG. 15); and a fifth projection 125B that is projected to the upper rail 122 side from the other end in the movement direction (a left end in FIG. 15). In addition, the moving surface 126 of the moving rail 125 is provided with a sixth projection 125C that is projected to the upper rail 122 side from a portion on the other end side from a center thereof.

As shown in FIG. 15, in a state where the drawer section 110 is arranged in the case 100, the entire moving rail 125 is arranged between the paired fixed rails 121. In this case, the first projection 122A of the upper rail 122 comes into contact with the fourth projection 125A of the moving rail 125, and the second projection 122B of the upper rail 122 comes into contact with the fifth projection 125B of the moving rail 125. Accordingly, the moving rail 125 is brought into a state of being interpose between the upper rail 122 and the lower rail 123.

Meanwhile, when the drawer section 110 is slid out of the case 100, the moving rail 125 slides on the lower rail 123. In this way, sliding out of the drawer section 110 is guided. As shown in FIG. 16, when the drawer section 110 is slid out of the case 100, relative positions of the moving rail 125 and the fixed rail 121 to each other are changed, and a portion on the one end side of the moving rail 125 is slid out of a portion between the upper rail 122 and the lower rail 123. Just as described, in a state where the drawer section 110 is slid out, the first projection 122A of the upper rail 122 comes into contact with the sixth projection 125C of the moving rail 125, and the third projection 122C of the upper rail 122 comes into contact with the fifth projection 125B of the moving rail 125. Accordingly, the moving rail 125 is brought into the state of being interposed between the upper rail 122 and the lower rail 123.

In the storage box described in JP 2008-37147 A, in both states that are the state where the drawer section 110 is arranged in the case 100 and the state where the drawer section 110 is slid out of the case 100, the moving rail 125, which is coupled to the drawer section 110, is brought into a state of being interposed between the fixed rails 121. In this way, rattling of the drawer section 110 is suppressed.

SUMMARY

In the storage box described in JP 2008-37147 A, when the drawer section moves, the sixth projection of the moving rail passes between the third projection of the upper rail and the lower rail. In this case, the sixth projection and the third projection possibly interfere with each other to inhibit smooth movement of the drawer section.

A storage box according to a first aspect of the disclosure includes: a case; a moving body that moves relative to the case; and slide mechanisms that guide relative movement of the moving body. Each of the slide mechanisms includes a fixed rail that is disposed in the case, and a moving rail that is disposed in the moving body. The moving rail is provided with a first projection and a second projection that are projected toward a corresponding one of the fixed rails and that are apart from each other in a movement direction of the moving body. The first projection and the second projection are apart from each other when seen in the movement direction. The fixed rail is provided with: a third projection and a fifth projection that are projected toward the moving rail and respectively come into contact with the first projection and the second projection at a time when the moving body is located at a first position; and a fourth projection and a sixth projection that respectively come into contact with the first projection and the second projection at a time when the moving body is located at a second position.

In the above configuration, the first projection and the second projection, which are provided on the moving rail, are apart from each other when seen in the movement direction. The fixed rail is provided with the third projection and the fifth projection that respectively come into contact with the first projection and the second projection at the time when the moving body is located at the first position, and is provided with the fourth projection and the sixth projection that respectively come into contact with the first projection and the second projection at the time when the moving body is located at the second position. Just as described, the third projection, the fourth projection, the fifth projection, and the sixth projection are arranged to come into contact with the first projection and the second projection, which are apart from each other when seen in the movement direction. Thus, the first projection can be less likely to interfere with the fifth projection and the sixth projection at a time when the moving body moves from the first position to the second position and the first projection reaches a state of contacting the fourth projection from a state of contacting the third projection. In addition, the second projection can be less likely to interfere with the third projection and the fourth projection at a time when the moving body moves from the first position to the second position and the second projection reaches a state of contacting the sixth projection from a state of contacting the fifth projection. Note that the same applies to a time when the moving body moves from the second position to the first position. Thus, according to the above configuration, rattling of the moving body at a time when the moving body is arranged at the first position or the second position can be suppressed, and the moving body can move smoothly.

In the above storage box, the third projection may have a contact surface at a distal end in a projected direction that is configured to contact the first projection, the fourth projection may have a contact surface at a distal end in the projected direction that is configured to contact the first projection, the first projection may have a first distal surface at a distal end in the projected direction that is configured to contact the third projection and the fourth projection, and each of the contact surface of the third projection and the contact surface of the fourth projection may have a larger area than the first distal surface of the first projection. The fifth projection may have a contact surface at a distal end in the projected direction that is configured to contact the second projection, the sixth projection may have a contact surface at a distal end in the projected direction that is configured to contact the second projection, the second projection may have a second distal surface at a distal end in the projected direction that is configured to contact the fifth projection and the sixth projection, and each of the contact surface of the fifth projection and the contact surface of the sixth projection may have a larger area than the second distal surface of the second projection does.

In the above configuration, the contact surface of each of the third projection and the fourth projection provided on the fixed rail is larger than the first distal surface of the first projection provided in the moving rail, and the contact surface of each of the fifth projection and the sixth projection provided on the fixed rail is larger than the second distal surface of the second projection provided in the moving rail. In the case where the moving rail moves relative to the fixed rail and the moving body is arranged at the first position or the second position, arrangement thereof possibly deviate from a specified position. However, even when such disarrangement of the moving body occurs, the above configuration can suppress a reduction in a contact area of each of the projections. Accordingly, the above configuration contributes to improvement in arrangement stability of the moving body at the first position and the second position.

Note that, instead of the contact surfaces of the first projection and the second projection provided on the moving rail, which moves with the moving body, the contact surfaces of the third projection to the sixth projection provided on the fixed rail, which is fixed to the case, are increased. Thus, the above configuration can contribute to the improvement in the arrangement stability of the moving body while suppressing an increase in mass of the moving body.

In the above storage box, in both of the cases where the moving body is located at the first position and the moving body is located at the second position, the entire moving rail in the movement direction may oppose the fixed rail, the first projection may be arranged at one end in the movement direction of the moving rail, and the second projection may be arranged at the other end in the movement direction of the moving rail.

In the above configuration, in the cases where the moving body is located at the first position and the moving body is located at the second position, both of the ends of the moving rail are supported by the fixed rail. Thus, according to the above configuration, compared to a configuration that supports a central portion of the moving rail, inclination of the moving body is suppressed, and thus the arrangement stability of the moving body at the times when the moving body is located at the first position and the second position is improved.

A storage box according to a second aspect of the disclosure includes: a case; a moving body that moves relative to the case; and slide mechanisms that guide relative movement of the moving body. Each of the slide mechanisms includes a fixed rail that is disposed in the case and a moving rail that is disposed in the moving body. The fixed rail is provided with a first projection and a second projection that are projected toward a corresponding one of the moving rail and that are apart from each other in a movement direction of the moving body. The first projection and the second projection are apart from each other when seen in the movement direction. The moving rail is provided with: a third projection and a fifth projection that are projected toward the fixed rail and respectively come into contact with the first projection and the second projection at a time when the moving body is located at a first position; and a fourth projection and a sixth projection that respectively come into contact with the first projection and the second projection at a time when the moving body is located at the second position.

In the above configuration, the first projection and the second projection, which are provided on the fixed rail, are apart from each other when seen in the movement direction. The moving rail is provided with: the third projection and the fifth projection that respectively come into contact with the first projection and the second projection at the time when the moving body is located at the first position; and the fourth projection and the sixth projection that respectively come into contact with the first projection and the second projection at the time when the moving body is located at the second position. Just as described, the third projection, the fourth projection, the fifth projection, and the sixth projection are arranged to come into contact with the first projection and the second projection, which are apart from each other when seen in the movement direction. Thus, the first projection can be less likely to interfere with the fifth projection and the sixth projection at a time when the moving body moves from the first position to the second position and the first projection reaches a state of contacting the fourth projection from a state of contacting the third projection. In addition, the second projection can be less likely to interfere with the third projection and the fourth projection at a time when the moving body moves from the first position to the second position and the second projection reaches a state of contacting the sixth projection from a state of contacting the fifth projection. Note that the same applies to a time when the moving body moves from the second position to the first position. Thus, according to the above configuration, rattling of the moving body at a time when the moving body is arranged at the first position or the second position can be suppressed, and the moving body can move smoothly.

In each of the above storage boxes, each of the first projection and the second projection may have a truncated polygonal pyramid shape or a truncated cone shape, a cross-sectional area of which may be reduced toward a distal end in the projected direction. When the moving body reaches a state of being arranged at the first position or the second position from a state of making relative movement, a lateral surface of the first projection possibly comes into contact with lateral surfaces of the third projection and the fourth projection. In the above configuration, each of the first projection and the second projection is formed in the truncated polygonal pyramid shape or the truncated cone shape. Accordingly, even if the lateral surface of the first projection comes into contact with the lateral surfaces of the third projection and the fourth projection, the first distal surface of the first projection is smoothly shifted to contact with the contact surfaces of the third projection and the fourth projection. Note that the same applies to a relationship between the second projection and each of the fifth projection and the sixth projection. Accordingly, even when the relative movement of the moving body is unstable, the moving body can further reliably be arranged at the first position or the second position.

In each of the above storage boxes, each of the third projection, the fourth projection, the fifth projection, and the sixth projection may have the truncated polygonal pyramid shape or the truncated cone shape, the cross-sectional area of which may be reduced toward the distal end in the projected direction.

When the moving body reaches the state of being arranged at the first position or the second position from the state of making the relative movement, the lateral surface of the first projection possibly comes into contact with the lateral surfaces of the third projection and the fourth projection. In the above configuration, each of the third projection, the fourth projection, the fifth projection, and the sixth projection is formed in the truncated polygonal pyramid shape or the truncated cone shape. Accordingly, even if the lateral surface of the first projection comes into contact with the lateral surfaces of the third projection and the fourth projection, the first distal surface of the first projection is smoothly shifted to the contact with the contact surfaces of the third projection and the fourth projection. Note that the same applies to the relationship between the second projection and each of the fifth projection and the sixth projection. Accordingly, even when the relative movement of the moving body is unstable, the moving body can further reliably be arranged at the first position or the second position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
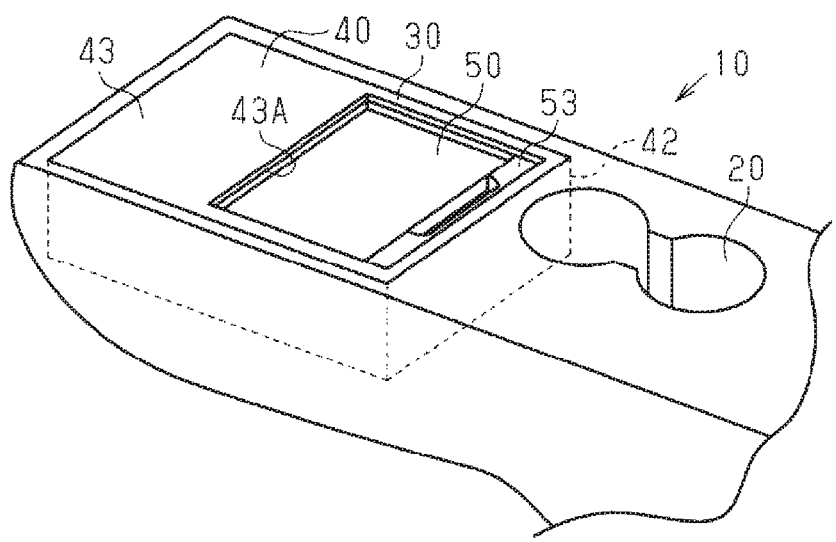
FIG. 1 is a perspective view of a center console in which one embodiment of a storage box is disposed.

Referring to FIG. 1 to FIG. 9, a description will be made on one embodiment of a storage box. As shown in FIG. 1, a center console 10 that is arranged between a driver's seat and a passenger's seat in a vehicle is provided with a cup holder 20, a storage box 30, and the like. The storage box 30 has a case 40 that is provided in the center console 10. The case 40 is provided with a lid body 50 as a moving body that is movable relative to the case 40.

Figure 2:
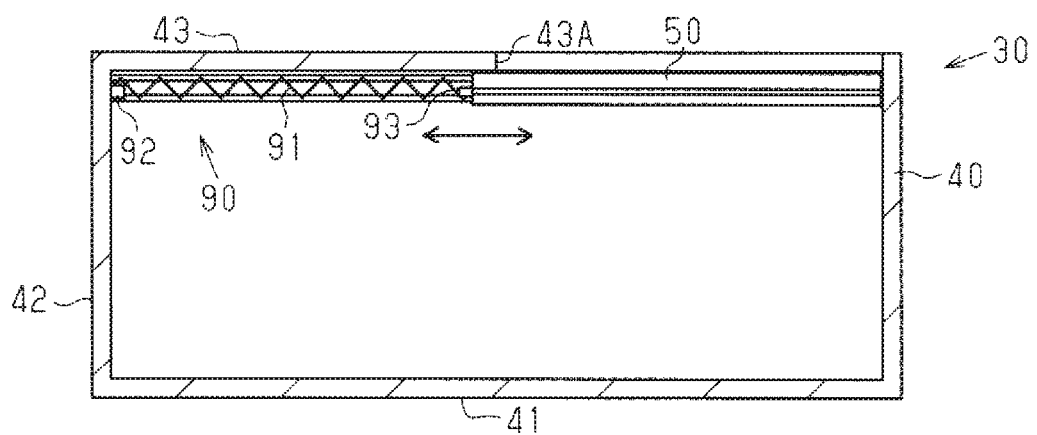
FIG. 2 is a cross-sectional view that schematically shows a configuration of the storage box, an opening of which is closed.

As shown in FIG. 1 and FIG. 2, the case 40 is formed in a rectangular parallelepiped shape and is configured by including: a lower wall 41 in a parallelepiped plate shape; a lateral wall 42 that is vertically provided from a peripheral edge of the lower wall 41; and an upper wall 43 that couples an upper end of the lateral wall 42. The lateral wall 42 is vertically provided around a whole circumference of the peripheral edge of the lower wall 41. The upper wall 43 is formed with an opening 43A. The opening 43A is substantially half the size of the upper wall 43. The opening 43A is arranged on a rear side of the vehicle (a right side in FIG. 2). Accordingly, the case 40 is formed in such a shape that a half thereof on the rear side of the vehicle is opened upward. The lid body 50 is arranged at a position near the upper wall 43 in the case 40. The lid body 50 is set in size to be able to close the opening 43A of the case 40.

Figure 3:
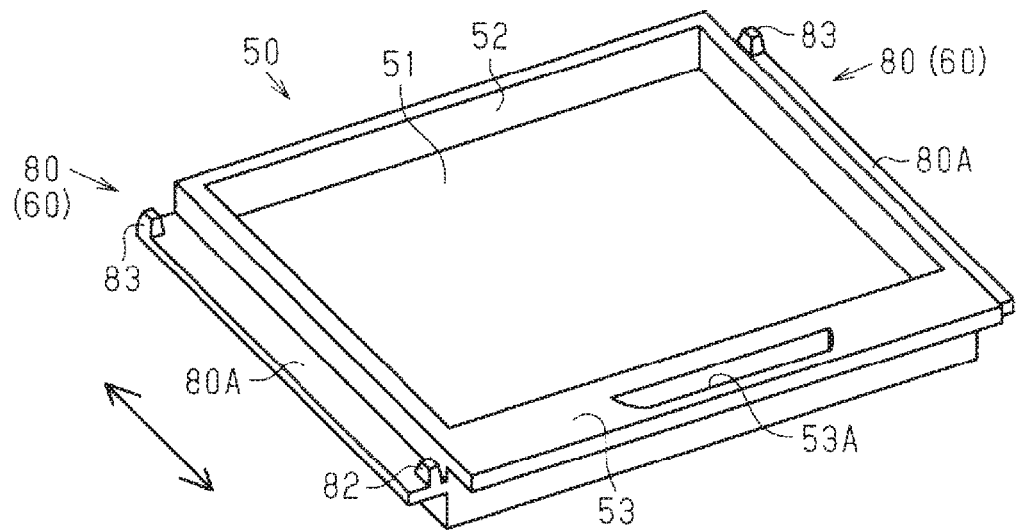
FIG. 3 is a perspective view that schematically shows a configuration of a lid body.

As shown in FIG. 3, the lid body 50 has: a bottom wall 51 in a parallelepiped plate shape; and a peripheral wall 52 that is vertically provided from a peripheral edge of the bottom wall 51. The peripheral wall 52 is vertically provided around a whole circumference of the peripheral edge of the bottom wall 51. In this way, the lid body 50 has a box shape that is opened upward. The lid body 50 is provided with an operation wall 53. The operation wall 53 is arranged on one end side in a short or transverse direction of the bottom wall 51, which is indicated by an arrow in FIG. 3, and extends outward from an upper end of the peripheral wall 52. An operation hole 53A is formed in a central portion of the operation wall 53. The lid body 50 can make relative movement to the case 40 in the directions indicated by the arrows in FIG. 2 and FIG. 3, that is, can make the relative movement in the short direction of the bottom wall 51. As shown in FIG. 1 and FIG. 2, the opening 43A of the case 40 is closed when the operation wall 53 of the lid body 50 is disposed at an abutment position against the lateral wall 42 of the case 40. This state is referred to as a closed position of the lid body 50.

Figure 4:
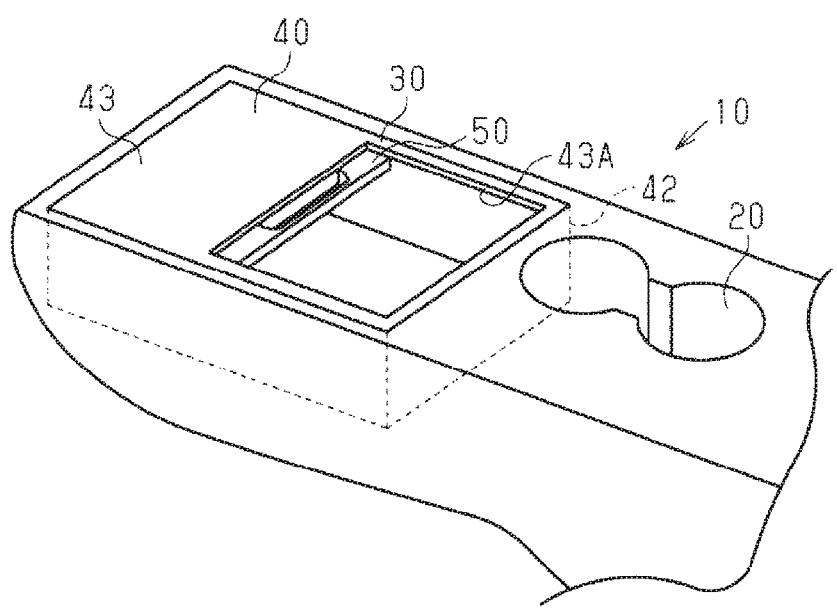
FIG. 4 is a perspective view of the center console in a state where the storage box is opened.

In addition, as shown in FIG. 4, when the lid body 50 moves relative to the case 40 and substantially an entirety of the lid body 50 is arranged below the upper wall 43, the opening 43A of the case 40 is opened. This state is referred to as an opened position of the lid body 50. Just as described, the lid body 50 can move relative to the case 40 between the closed position and the opened position, the closed position corresponds to the first position, and the opened position corresponds to the second position.

Figure 5:
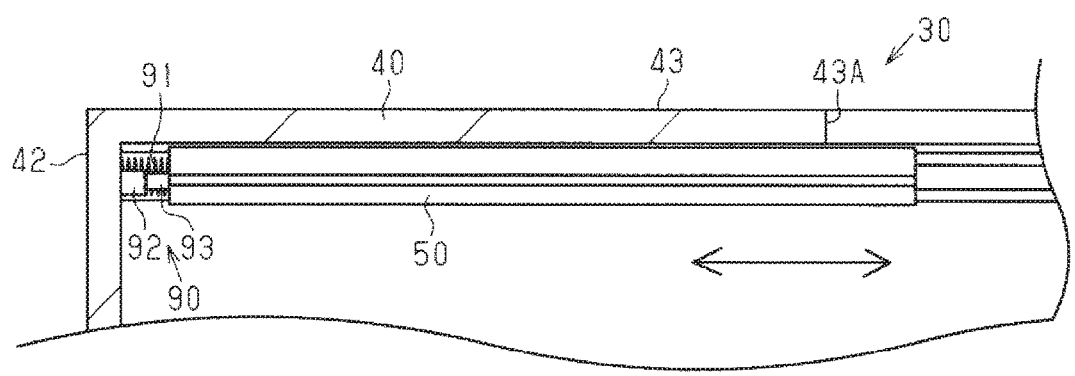
FIG. 5 is a cross-sectional view that schematically shows the configuration of the opened storage box.

As shown in FIG. 2 and FIG. 5, a holding mechanism 90 that holds the lid body 50 at the opened position is provided in the case 40. The holding mechanism 90 is configured by including: a spring 91 that is arranged between the lateral wall 42 of the case 40 and the peripheral wall 52 of the lid body 50; a latch 92 that is fixed to the lateral wall 42 of the case 40; and a claw 93 that is fixed to the peripheral wall 52 of the lid body 50.

As shown in FIG. 5, while the lid body 50 is located at the opened position, the spring 91 is brought into a compressed state, the latch 92 holds the claw 93, and the movement of the lid body 50 is thereby restricted. The latch 92 is configured to alternatively repeat holding and releasing of the claw 93 by pressing. Accordingly, when the lid body 50 is operatively pressed to the opened position side (a left side in FIG. 5) from this state, holding of the claw 93 by the latch 92 is cancelled. Then, as shown in FIG. 2, the lid body 50 moves to the closed position by an urging force of the spring 91. Meanwhile, when the lid body 50 is located at the closed position, the lid body 50 is operatively pressed toward the opened position side against the urging force of the spring 91, and the claw 93 thereby abuts against the latch 92. When the lid body 50 is further operatively pressed to the opened position side in this state, the latch 92 holds the claw 93, and the movement of the lid body 50 is thereby restricted. In this way, as shown in FIG. 5, the lid body 50 is held at the opened position in a state where the spring 91 remains to be compressed.

Figure 6:
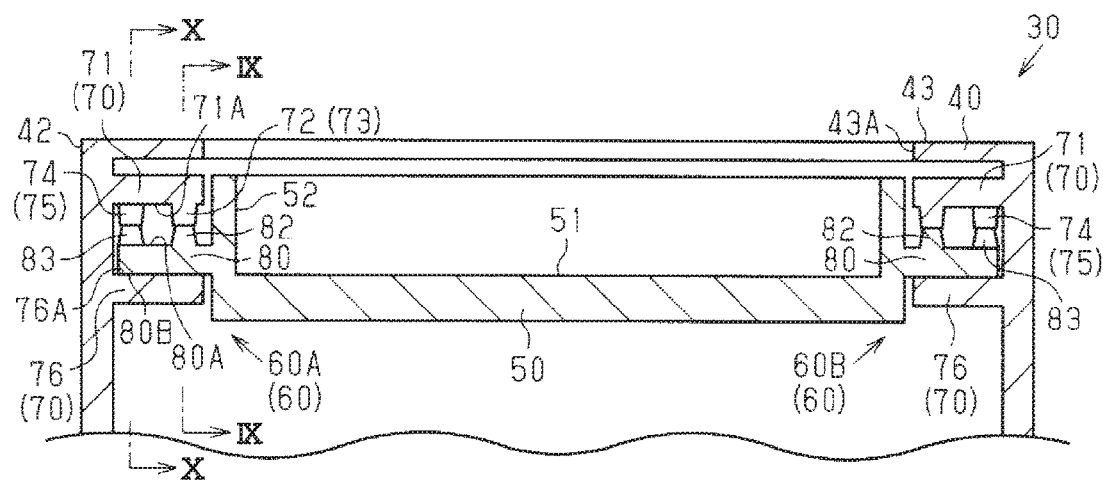
FIG. 6 is a cross-sectional view that schematically shows a configuration of a slide mechanism.

As shown in FIG. 6, the storage box 30 is provided with a slide mechanism 60 that guides the relative movement of the lid body 50 to the case 40 in the storage box 30. The slide mechanism 60 is provided as a pair in a longitudinal direction of the lid body 50 (the horizontal direction in FIG. 6) in a manner to interpose the lid body 50. This paired slide mechanisms 60 are configured to be symmetrical to each other. Accordingly, a configuration of one (left in FIG. 6) slide mechanism 60A will be described below. A configuration of the other slide mechanism 60B (right in FIG. 6) will be denoted by the same reference numerals, and a description thereon will not be made.

The slide mechanism 60 has a fixed rail 70 that is disposed in the case 40. The fixed rail 70 is configured by including paired rails. The paired rails oppose each other while being vertically separated from each other. Of the paired rails, the rail that is arranged on an upper side will be referred to as an upper rail 71, and the rail that is arranged on a lower side will be referred to as a lower rail 76. In the fixed rail 70, one end of each of the rails 71, 76 is coupled to an inner peripheral surface of the lateral wall 42 of the case 40. The fixed rail 70 extends in a plate shape in a continuous manner in the movement direction of the lid body 50 (a depth direction in FIG. 6) from one end to the other end of the lateral wall 42 of the case 40.

The slide mechanism 60 has a moving rail 80 that is disposed in the lid body 50. The moving rail 80 is a single rail and is arranged between the upper rail 71 and the lower rail 76 of the fixed rail 70. One end of the moving rail 80 is coupled to an outer peripheral surface of the peripheral wall 52 of the lid body 50. The moving rail 80 extends in a plate shape in a continuous manner in the movement direction from one end to the other end of the peripheral wall 52 of the lid body 50. Plate thickness and plate width of the moving rail 80 are the same as plate thickness and plate width of each of the rails 71, 76 of the fixed rail 70. Meanwhile, length of the moving rail 80 is set to be substantially a half of the length of the fixed rail 70. A raw material that constitutes the fixed rail 70 is the same as a raw material that constitutes the moving rail 80. Accordingly, mass of the moving rail 80 is about ¼ of mass of the fixed rail 70. A lower surface 80B of the moving rail 80 abuts against an upper surface 76A of the lower rail 76. A distance between the rails 71, 76 of the fixed rail 70 is greater than thickness of the moving rail 80. Thus, an upper surface 80A of the moving rail 80 is separated from a lower surface 71A of the upper rail 71. The fixed rail 70 is fixed to the case 40, and the moving rail 80 moves, together with the lid body 50, relative to the case 40 and the fixed rail 70. When the lid body 50 moves relative to the case 40, the moving rail 80 slides on the lower rail 76 and guides the relative movement of the lid body 50.

As shown in FIG. 3 and FIG. 6, the moving rail 80 is provided with a first projection 82 and a second projection 83, each of which projects upward, that is, toward the upper rail 71 from the upper surface 80A thereof. The first projection 82 and the second projection 83 are arranged to be apart from each other in the movement direction of the lid body 50. Note that the first projection 82 is provided at one end in the movement direction and the second projection 83 is provided at the other end in the movement direction. The first projection 82 has the same shape as the second projection 83, and each of them is formed in a truncated quadrangular pyramid shape. That is, each of the first projection 82 and the second projection 83 has a trapezoidal shape in a side view, and a cross-sectional area thereof is reduced toward a distal end in a projected direction. In addition, as shown in FIG. 6, when seen in the movement direction of the lid body 50, the first projection 82 and the second projection 83 are apart from each other and thus do not overlap each other.

Figure 7:
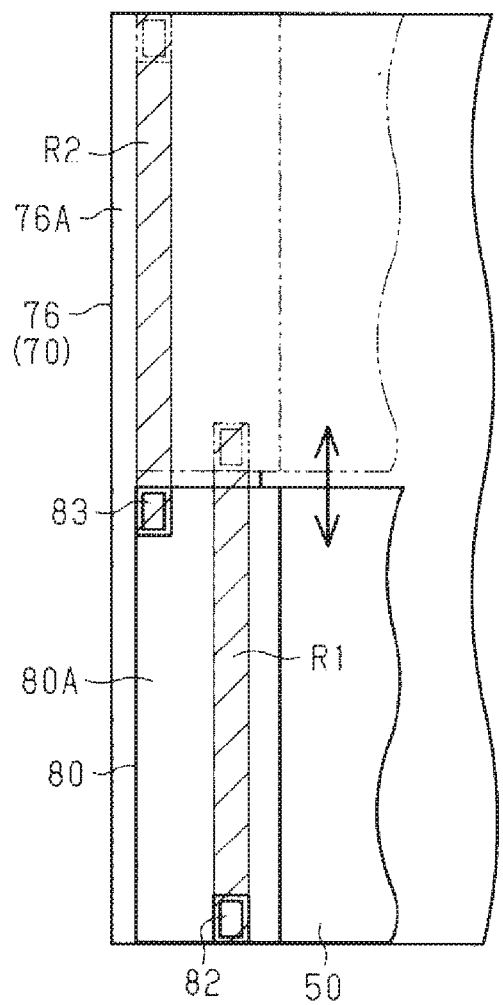
FIG. 7 is a plan view that shows relative movement trajectories of a first projection and a second projection at a time when the lid body moves between a first position and a second position.

FIG. 7 shows: a first trajectory R1 as a relative movement trajectory of the first projection 82 to the fixed rail 70 at a time when the lid body 50 moves between the closed position, which is indicated by a solid line in FIG. 7, and the opened position, which is indicated by a two-dot chain line in FIG. 7; and a second trajectory R2 as a relative movement trajectory of the second projection 83 to the fixed rail 70 at a time when the lid body 50 moves. Because the first projection 82 and the second projection 83 are apart from each other when seen in the movement direction, these first trajectory and second trajectory are also apart from each other when seen in the movement direction. Note that the first trajectory and the second trajectory are apart from each other in an orthogonal direction (the horizontal direction in FIG. 7) to the movement direction of the lid body 50.

Figure 8:
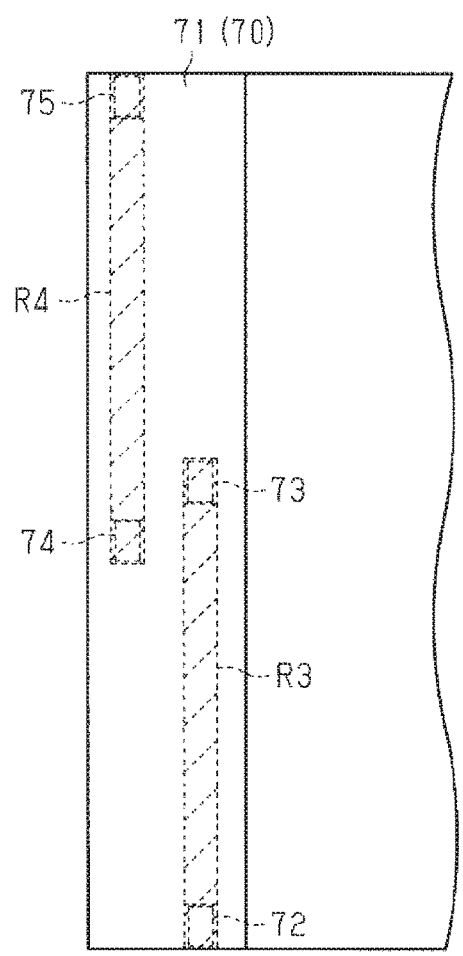
FIG. 8 is a plan view that shows an arrangement aspect of a third projection, a fourth projection, a fifth projection, and a sixth projection provided on an upper rail.

As shown in FIG. 8, a projection region at a time when the first trajectory R1 is projected onto the lower surface 71A of the upper rail 71 in a perpendicular direction to the upper surface 80A of the moving rail 80, that is, a region of the upper rail 71 that overlaps the first trajectory R1 in a plan view is set as a first projection region R3. In the upper rail 71, a third projection 72 and a fourth projection 73 are arranged in the first projection region R3. The third projection 72 and the fourth projection 73 are apart from each other in the movement direction of the lid body 50 (a vertical direction in FIG. 8). In addition, a projection region where the second trajectory R2 is projected onto the lower surface 71A of the upper rail 71 in the perpendicular direction to the upper surface 80A of the moving rail 80, that is, a region that overlaps the second trajectory R2 in the upper rail 71 in the plan view is set as a second projection region R4. In the upper rail 71, a fifth projection 74 and a sixth projection 75 are arranged on the second projection region R4. The fifth projection 74 and the sixth projection 75 are apart from each other in the movement direction.

Figure 9:
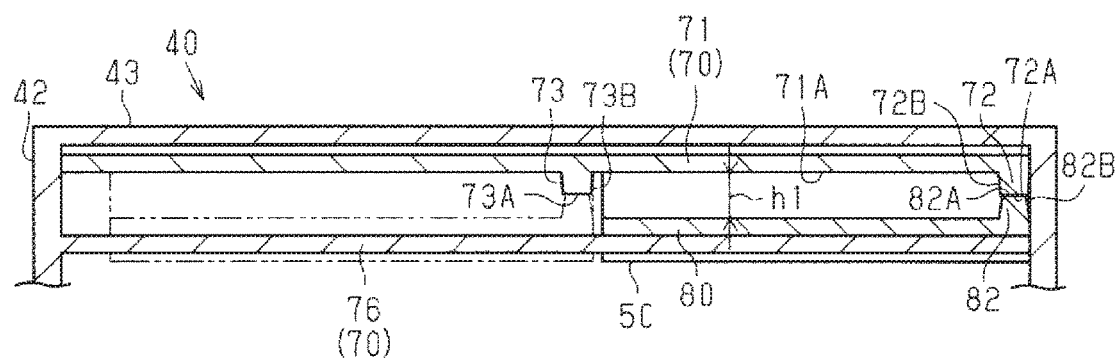
FIG. 9 is a cross-sectional view that is taken along line IX-IX in FIG. 6.

As shown in FIG. 9, the third projection 72 and the fourth projection 73 are projected downward, that is, toward the moving rail 80 from the lower surface 71A of the upper rail 71. The third projection 72 has the same shape as the fourth projection 73, and each of them is formed in the truncated quadrangular pyramid shape. That is, each of the third projection 72 and the fourth projection 73 has the trapezoidal shape in a side view, and a cross-sectional area thereof is reduced toward a distal end in the projected direction. Each of a distal surface 72A in the projected direction of the third projection 72 and a distal surface 73A in the projected direction of the fourth projection 73 is larger than a first distal surface 82A as a distal surface in the projected direction of the first projection 82 that is provided in the moving rail 80. In addition, each of a base end surface of the third projection 72, which is coupled to the upper rail 71, and a base end surface of the fourth projection 73, which is coupled to the upper rail 71, has the same area as a base end surface of the first projection 82, which is coupled to the moving rail 80. Height that is obtained by adding projection height of the first projection 82 and either one of projection height of the third projection 72 and projection height of the fourth projection 73 is equal to height h1 between the upper surface 80A of the moving rail 80 and the lower surface 71A of the upper rail 71. In this embodiment, each of the projection height of the first projection 82, the projection height of the third projection 72, and the projection height of the fourth projection 73 is set to be the half of the height h1.

As indicated by a solid line in FIG. 9, the third projection 72 is arranged in a manner to correspond to a position of the first projection 82 at the time when the lid body 50 is located at the closed position. In addition, as indicated by a two-dot chain line in FIG. 9, the fourth projection 73 is arranged in a manner to correspond to the position of the first projection 82 at the time when the lid body 50 is located at the opened position. Accordingly, when the lid body 50 is located at the closed position, the first distal surface 82A of the first projection 82 comes into contact with the distal surface 72A of the third projection 72. When the lid body 50 is located at the opened position, the first distal surface 82A of the first projection 82 comes into contact with the distal surface 73A of the fourth projection 73. That is, each of the distal surface 72A of the third projection 72 and the distal surface 73A of the fourth projection 73 functions as a contact surface that contacts the first projection 82. In both cases where the lid body 50 is located at the closed position and the lid body 50 is located at the opened position, the entire moving rail 80 in the movement direction opposes the upper rail 71 and the lower rail 76 of the fixed rail 70. Accordingly, when the lid body 50 is located at the closed position, and when the lid body 50 is located at the opened position, one end (a right end in FIG. 9) in the movement direction of the moving rail 80 is brought into an interposed state between the upper rail 71 and the lower rail 76.

Figure 10:
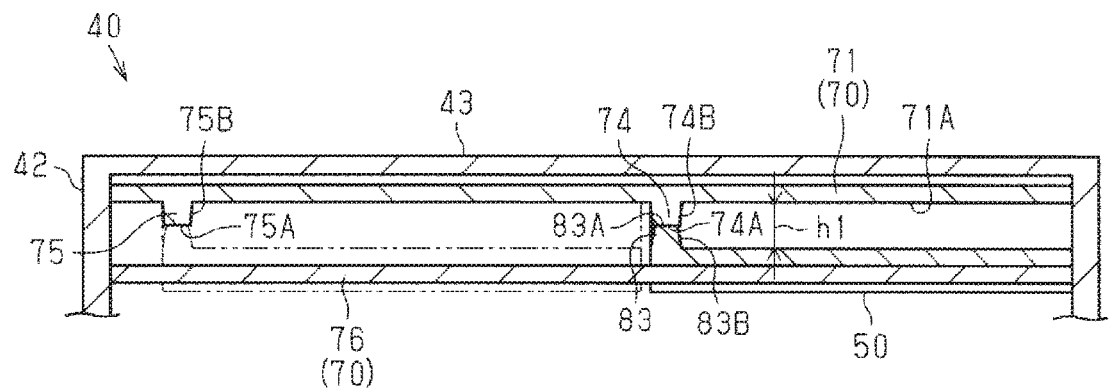
FIG. 10 is a cross-sectional view that is taken along line X-X in FIG. 6.

As shown in FIG. 10, the fifth projection 74 and the sixth projection 75 are projected downward, that is, toward the moving rail 80 from the lower surface 71A of the upper rail 71. The fifth projection 74 and the sixth projection 75 have the same shape, and each thereof is formed in the truncated quadrangular pyramid shape. That is, each of the fifth projection 74 and the sixth projection 75 has a truncated shape in a side view, and a cross-sectional area thereof is reduced toward a distal end in the projected direction. Each of a distal surface 74A in the projected direction of the fifth projection 74 and a distal surface 75A in the projected direction of the sixth projection 75 has a larger area than a second distal surface 83A as a distal surface in the projected direction of the second projection 83 that is provided in the moving rail 80. In addition, each of a base end surface of the fifth projection 74, which is coupled to the upper rail 71, and a base end surface of the sixth projection 75, which is coupled to the upper rail 71, has the same area as a base end surface that is coupled to the moving rail 80 in the second projection 83. Height that is obtained by adding projection height of the second projection 83 and either one of projection height of the fifth projection 74 and projection height of the sixth projection 75 is equal to the height h1 between the upper surface 80A of the moving rail 80 and the lower surface 71A of the upper rail 71. In this embodiment, each of the projection height of the second projection 83, the projection height of the fifth projection 74, and the projection height of the sixth projection 75 is set to be the half of the height h1.

As indicated by a solid line in FIG. 10, the fifth projection 74 is arranged in a manner to correspond to a position of the second projection 83 at the time when the lid body 50 is located at the closed position. In addition, as indicated by a two-dot chain line in FIG. 10, the sixth projection 75 is arranged in a manner to correspond to the position of the second projection 83 at the time when the lid body 50 is located at the opened position. Accordingly, when the lid body 50 is located at the closed position, the second distal surface 83A of the second projection 83 comes into contact with the distal surface 74A of the fifth projection 74. When the lid body 50 is located at the opened position, the second distal surface 83A of the second projection 83 comes into contact with the distal surface 75A of the sixth projection 75. That is, each of the distal surface 74A of the fifth projection 74 and the distal surface 75A of the sixth projection 75 functions as a contact surface that contacts the second projection 83. Accordingly, when the lid body 50 is located at the closed position, and when the lid body 50 is located at the opened position, the other end (a left end in FIG. 10) in the movement direction of the moving rail 80 is brought into the interposed state between the upper rail 71 and the lower rail 76. In this embodiment, the third projection 72, the fourth projection 73, the fifth projection 74, and the sixth projection 75 are formed in the same shape. Accordingly, when seen in the movement direction of the lid body 50 as shown in FIG. 6, the third projection 72 overlaps the fourth projection 73, and the fifth projection 74 overlaps the sixth projection 75.

As shown in FIG. 8, in the movement direction (the vertical direction in FIG. 8), the fourth projection 73 is arranged between the fifth projection 74 and the sixth projection 75, and the fifth projection 74 is arranged between the third projection 72 and the fourth projection 73. Meanwhile, the third projection 72 and the fourth projection 73 are arranged in the second projection region R4 that is provided with the fifth projection 74 and the sixth projection 75, and the fifth projection 74 and the sixth projection 75 are not arranged in the first projection region R3 that is provided with the third projection 72 and the fourth projection 73. Accordingly, as shown in FIG. 6, when seen in the movement direction, the third projection 72 and the fourth projection 73 do not respectively overlap the fifth projection 74 and the sixth projection 75.

A description will be made on operational effects of this embodiment. (1) In this embodiment, in both of the cases where the lid body 50 is located at the closed position and the lid body 50 is located at the opened position, the first projection 82 comes into contact with the third projection 72 or the fourth projection 73, and the second projection 83 comes into contact with the fifth projection 74 or the sixth projection 75. Accordingly, in both of the cases where the lid body 50 is located at the closed position and the lid body 50 is located at the opened position, the moving rail 80, which is coupled to the lid body 50, is brought into the interposed state between the fixed rail 70, and thus vertical rattling of the lid body 50 can be suppressed.

The first projection 82 and the second projection 83, which are provided in the moving rail 80, are apart from each other when seen in the movement direction of the lid body 50. That is, the first trajectory R1, which is the relative movement trajectory of the first projection 82 provided in the moving rail 80 onto the fixed rail 70, is apart from the second trajectory R2, which is the relative movement trajectory of the second projection 83 onto the fixed rail 70, when seen in the movement direction. The upper rail 71 is provided with: the third projection 72 that comes into contact with the first projection 82; and the fifth projection 74 that comes into contact with the second projection 83 when the lid body 50 is located at the projection position. The upper rail 71 is also provided with: the fourth projection 73 that comes into contact with the first projection 82; and the sixth projection 75 that comes into contact with the second projection 83 when the lid body 50 is located at the opened position. Just as described, the third projection 72, the fourth projection 73, the fifth projection 74, and the sixth projection 75 are arranged to contact the first projection 82 and the second projection 83, which are apart from each other when seen in the movement direction. That is, the third projection 72 and the fourth projection 73, which contacts the first projection 82, are arranged in the projection region of the first trajectory R1, and the fifth projection 74 and the sixth projection 75, which contact the second projection 83, are arranged in the projection region of the second trajectory R2. In this embodiment, the fourth projection 73 is arranged between the fifth projection 74 and the sixth projection 75 in the movement direction (the vertical direction in FIG. 8), and the fifth projection 74 is arranged between the third projection 72 and the fourth projection 73. Also in this case, when the lid body 50 moves, at a position between the closed position and the opened position thereof, the first projection 82 is prevented from coming into contact with the fifth projection 74 and the sixth projection 75, and the second projection 83 is prevented from coming into contact with the third projection 72 and the fourth projection 73. That is, the first projection 82 can be less likely to interfere with the fifth projection 74 and the sixth projection 75 at a time when the lid body 50 moves from the closed position to the opened position and the first projection 82 reaches a state of contacting the fourth projection 73 from a state of contacting the third projection 72. In addition, the second projection 83 can be less likely to interfere with the third projection 72 and the fourth projection 73 at a time when the lid body 50 moves from the closed position to the opened position and the second projection 83 reaches a state of contacting the sixth projection 75 from a state of contacting the fifth projection 74. Note that the same applies to a time when the lid body 50 moves from the opened position to the closed position. As a result, the lid body 50 can smoothly move, which in turn suppresses occurrence of return failure of the lid body 50 at the time when the lid body 50 returns from the opened position to the closed position by the urging force of the spring 91 in the holding mechanism 90.

(2) The first projection 82 and the second projection 83 are provided on the moving rail 80, and the third projection 72, the fourth projection 73, the fifth projection 74, and the sixth projection 75 are provided on the upper rail 71. Then, the distal surfaces 72A, 73A as the contact surfaces of the third projection 72 and the fourth projection 73 are each set to be larger than the first distal surface 82A of the first projection 82, and the distal surfaces 74A, 75A as the contact surfaces of the fifth projection 74 and the sixth projection 75 are each set to be larger than the second distal surface 83A of the second projection 83.

In the cases where the moving rail 80 moves relative to the fixed rail 70 and the lid body 50 is arranged at the closed position or the opened position, the arrangement thereof possibly deviates from a specified position. In this embodiment, even when such deviation of the lid body 50 occurs, a reduction in the contact area of the first distal surface 82A of the first projection 82 with each of the distal surfaces 72A, 73A of the third projection 72 and the fourth projection 73 can be suppressed. In addition, a further reduction in the contact area of the second distal surface 83A of the second projection 83 with the distal surfaces 74A, 75A of the fifth projection 74 and the sixth projection 75 can be suppressed. Accordingly, the disclosure contributes to improvement in the arrangement stability of the lid body 50 at the closed position and the opened position. Note that, instead of the first projection 82 and the second projection 83 provided on the moving rail 80 that moves with the lid body 50, the distal surfaces 72A, 73A, 74A, 75A of the third projection 72, the fourth projection 73, the fifth projection 74, and the sixth projection 75 provided in the upper rail 71 that is fixed to the case 40 are increased. In this way, an increase in mass of the lid body 50 can be suppressed. Thus, the disclosure contributes to the improvement in the arrangement stability of the lid body 50 while improving movability of the lid body 50.

(3) In this embodiment, the first projection 82 is arranged at the one end in the movement direction of the moving rail 80, and the second projection 83 is arranged at the other end in the movement direction of the moving rail 80. Then, both of the ends of the moving rail 80 are interposed between and supported by the fixed rail 70 at the times when the lid body 50 is located at the closed position and the opened position. Accordingly, compared to a configuration that supports a central portion of the moving rail 80 by the fixed rail 70, inclination of the lid body 50 is suppressed. Thus, the arrangement stability of the lid body 50 at the closed position and the opened position is improved.

(4) Each of the first projection 82 and the second projection 83 provided on the moving rail 80 and the third projection 72, the fourth projection 73, the fifth projection 74, and the sixth projection 75 provided on the upper rail 71 is formed in truncated quadrangular pyramid shape. When the lid body 50 reaches the state of being arranged at the closed position or the opened position from the state of making the relative movement, a lateral surface 82B of the first projection 82 possibly comes into contact with lateral surfaces 72B, 73B of the third projection 72 and the fourth projection 73. In this embodiment, if the lateral surface 82B of the first projection 82 comes into contact with the lateral surfaces 72B, 73B of the third projection 72 and the fourth projection 73, the first distal surface 82A of the first projection 82 is smoothly shifted to contact with the distal surfaces 72A, 73A of the third projection 72 and the fourth projection 73. Note that, similarly, if a lateral surface 83B of the second projection 83 comes into contact with lateral surfaces 74B, 75B of the fifth projection 74 and the sixth projection 75, the second distal surface 83A of the second projection 83 is smoothly shifted to contact with the distal surfaces 74A, 75A of the fifth projection 74 and the sixth projection 75. Accordingly, even the relative movement of the lid body 50 is unstable, the lid body 50 is further reliably arranged at the closed position or the opened position.

(5) It is configured that the fixed rail 70 is the paired rails that separate from each other and that the moving rail 80 is arranged between the paired rails of the fixed rail 70. As a configuration of the slide mechanism 60, the fixed rail 70 is provided not in the lid body 50 but in the case 40. The moving rail 80 is configured that the mass thereof is smaller than the mass of the fixed rail 70 that is constructed of the paired rails. Accordingly, an increase in the mass of the lid body 50, which is caused by disposition of the moving rail 80, can be suppressed, which contributes to the improvement in the movability at time when the lid body 50 moves.

The above embodiment can be changed and implemented as follows. The shape of each of the first projection 82, the second projection 83, the third projection 72, the fourth projection 73, the fifth projection 74, and the sixth projection 75 is not limited to the truncated quadrangular pyramid shape but may be in a truncated cone shape with a circular cross section or may be a truncated polygonal pyramid shape with a cross section in a shape other than a quadrilateral, for example. With these configurations, the same operational effect as above (3) can be obtained.

The shape of each of the first projection 82, the second projection 83, the third projection 72, the fourth projection 73, the fifth projection 74, and the sixth projection 75 may be changed to a shape other than the cone or the pyramid. For example, the shape of each of the first projection 82, the second projection 83, the third projection 72, the fourth projection 73, the fifth projection 74, and the sixth projection 75 may be changed to a rectangular columnar shape or a cylindrical shape.

The area of the distal surface 72A of the third projection 72 and the area of the distal surface 73A of the fourth projection 73 are set to be larger than the area of the first distal surface 82A of the first projection 82. However, this configuration can appropriately be changed. That is, at least one of the area of the distal surface 72A of the third projection 72 and the area of the distal surface 73A of the fourth projection 73 may be set to be the same as the area of the first distal surface 82A or to be smaller than the area of the first distal surface 82A. In addition, in regard to the setting aspect of the area of the base end surface of the third projection 72 and the area of the base end surface of the fourth projection 73, each of them does not have to be the same as the area of the base end surface of the first projection 82, and at least one of them may be larger or smaller than the area of the base end surface of the first projection 82.

The area of the distal surface 74A of the fifth projection 74 and the area of the distal surface 75A of the sixth projection 75 are set to be larger than the area of the second distal surface 83A of the second projection 83. However, this configuration can appropriately be changed. That is, at least one of the area of the distal surface 74A of the fifth projection 74 and the area of the distal surface 75A of the sixth projection 75 may be set to be the same as the area of the second distal surface 83A or to be smaller than the area of the second distal surface 83A. In addition, in regard to the setting aspect of the area of the base end surface of the fifth projection 74 and the area of the base end surface of the sixth projection 75, each of them does not have to be the same as the area of the base end surface of t the second projection 83, and at least one of them may be larger or smaller than the area of the base end surface of the second projection 83.

The shape of the first projection 82 and the shape of the second projection 83 are set to be the same. However, the shapes of these may differ from each other. The shapes of the third projection 72, the fourth projection 73, the fifth projection 74, and the sixth projection 75 are set to be the same. However, the shapes of these may differ from each other.

In the above embodiment, each of the projection height of the first projection 82, the projection height of the third projection 72, and the projection height of the fourth projection 73 is set to be the half of the height h1 between the upper surface 80A of the moving rail 80 and the lower surface 71A of the upper rail 71. This configuration can appropriately be changed when the first projection 82 can come into contact with the third projection 72 and the fourth projection 73 at the closed position or the opened position. For example, the projection height of the first projection 82 may be set to be ⅓ of the height h1, and the projection height of the third projection 72 and the projection height of the fourth projection 73 may be set to be ⅔ of the height h1.

In the above embodiment, each of the projection height of the second projection 83, the projection height of the fifth projection 74, and the projection height of the sixth projection 75 is set to be the half of the height h1 between the upper surface 80A of the moving rail 80 and the lower surface 71A of the upper rail 71. This configuration can appropriately be changed when the second projection 83 can come into contact with the fifth projection 74 and the sixth projection 75 at the closed position or the opened position. For example, the projection height of the second projection 83 may be set to be ⅓ of the height h1, and the projection height of the fifth projection 74 and the projection height of the sixth projection 75 may be set to be ⅔ of the height h1.

In the moving rail 80, the first projection 82 and the second projection 83 are provided at both of the ends in the movement direction. However, the arrangement aspect of the first projection 82 and the second projection 83 can appropriately be changed when the first projection 82 and the second projection 83 separate from each other. For example, one of the first projection 82 and the second projection 83 may be arranged in the central portion in the movement direction of the moving rail 80. Also, in this case, the third projection 72 and the fifth projection 74 are arranged such that the first projection 82 comes into contact with the third projection 72 and the second projection 83 comes into contact with the fifth projection 74 when the lid body 50 is located at the closed position. In addition, the fourth projection 73 and the sixth projection 75 may be arranged such that the first projection 82 comes into contact with the fourth projection 73 and the second projection 83 comes into contact with the sixth projection 75 when the lid body 50 is located at the opened position.

In both of the cases where the lid body 50 is located at the closed position and the lid body 50 is located at the opened position, the moving rail 80 is configured that the entity thereof in the movement direction opposes the upper rail 71 and the lower rail 76 of the fixed rail 70. However, this configuration can be changed. For example, the moving rail 80 may be configured that the entirety thereof in the movement direction opposes the rails 71, 76 of the fixed rail 70 when the lid body 50 is located at the opened position and that the one end thereof in the movement direction is slid out of a portion between the rails 71, 76 of the fixed rail 70 when the lid body 50 is located at the closed position. Also, in this case, in both of the cases where the lid body 50 is located at the closed position and the lid body 50 is located at the opened position, each of the projections 82, 83, 72, 73, 74, 75 may be arranged such that the first projection 82 comes into contact with the third projection 72 or the fourth projection 73 and that the second projection 83 comes into contact with the fifth projection 74 or the sixth projection 75.

The fixed rail 70 does not have to extend from the one end to the other end of the lateral wall 42 of the case 40 when each of the projections 72, 73, 74, 75 can be disposed in the manner to be able to contact the moving rail 80 at the closed position and the opened position. In addition, the moving rail 80 does not always have to extend from the one end to the other end of the peripheral wall 52.

The slide mechanism 60 of the above embodiment is configured that the fixed rail 70 is constructed of the paired rails and that the moving rail 80 is arranged between the paired rails. Instead of such a configuration, the moving rail 80 can be constructed of paired rails, and the fixed rail 70 can be configured as a single rail that is arranged between the paired rails.

Figure 11:
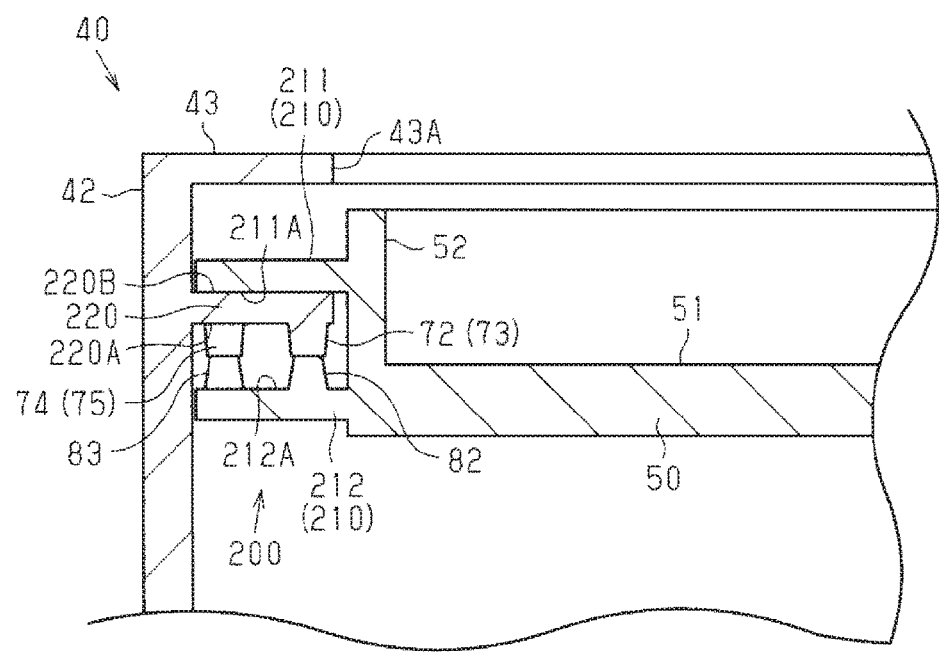
FIG. 11 is a cross-sectional view that schematically shows a configuration of a modified example of the slide mechanism.

As shown in FIG. 11, a slide mechanism 200 is configured by including: a fixed rail 220 that is disposed in the case 40; and a moving rail 210 that is disposed in the lid body. The moving rail 210 is configured by including paired rails. The paired rails separate and oppose each other in the vertical direction. Of the paired rails, the rail that is arranged on the upper side is referred to as an upper rail 211, and the rail that is arranged on the lower side is referred to as a lower rail 212. One end of each of the rails 211, 212 of the moving rail 80 is coupled to the outer peripheral surface of the peripheral wall 52 in the lid body 50. On the peripheral wall 52 of the lid body 50, the moving rail 210 continuously extends in a plate shape from the one end in the movement direction (a depth direction in FIG. 11) of the lid body 50 to the other end thereof in the movement direction.

The fixed rail 220 is arranged between the upper rail 211 and the lower rail 212 of the moving rail 210. The fixed rail 220 is a single rail, and one end thereof is coupled to an inner peripheral surface of the lateral wall 42 of the case 40. The fixed rail 220 continuously extends in the plate shape from one end in the movement direction of the lateral wall 42 of the case 40 to the other end thereof in the movement direction. Plate thickness and plate width of the fixed rail 220 are the same as plate thickness and plate width of each of the rails 211, 212 of the moving rail 210. Meanwhile, length of the fixed rail 220 is set to be appropriately twice as long as length of the moving rail 210. The upper rail 211 is placed on the fixed rail 220, and an upper surface 220B of the fixed rail 220 abuts against a lower surface 211A of the upper rail 211. A distance between the rails 211, 212 of the moving rail 210 is greater than the plate thickness of the fixed rail 220. Thus, a lower surface 220A of the fixed rail 220 is separated from an upper surface 212A of the lower rail 212. The fixed rail 220 is fixed to the case 40, and the moving rail 210 makes relative movement with the lid body 50 to the case 40 and the fixed rail 220. When the lid body 50 moves relative to the case 40, the upper rail 211 of the moving rail 210 slides with respect to the fixed rail 220 and guides the movement of the lid body 50.

Note that, in this configuration, the lower rail 212 as the moving rail is provided with the first projection 82 and the second projection 83 that are projected upward, that is, toward the fixed rail 220 from the upper surface 212A thereof. In addition, the fixed rail 220 is provided with the third projection 72, the fourth projection 73, the fifth projection 74, and the sixth projection 75 that are projected downward, that is, toward the lower rail 212 from the lower surface 220A thereof. A shape and an arrangement aspect of each of these first projection 82, the second projection 83, the third projection 72, the fourth projection 73, the fifth projection 74, and the sixth projection 75 are the same as those in the above embodiment and thus is denoted by the same reference numeral, and a detailed description thereon will not be made. Also, with such a configuration, the same operational effects as those in above (1) to (4) can be obtained.

In this configuration, the fixed rail 220 does not have to extend from the one end to the other end of the lateral wall 42 of the case 40 when each of the projections 72, 73, 74, 75 can be disposed in a manner to be able to contact the lower rail 212 at the closed position and the opened position. In addition, the moving rail 210 does not always have to extend from the one end to the other end of the peripheral wall 52.

Figure 12:
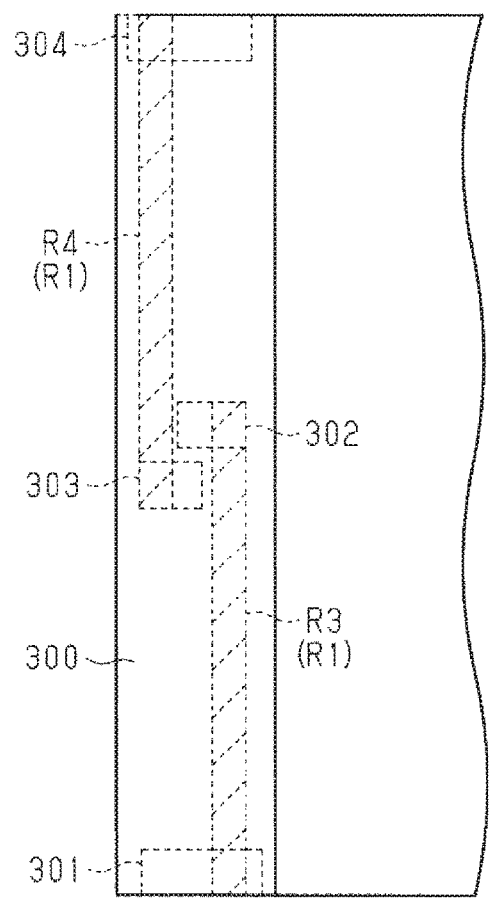
FIG. 12 is a plan view that shows a modified example of an arrangement aspect of each of a third projection, a fourth projection, a fifth projection, and a sixth projection on the fixed rail.

The arrangement aspect of each of the projections, which is disposed on the above-described fixed rail, can be changed as follows. As shown in FIG. 12, a fixed rail 300 is provided with: a third projection 301 that comes into contact with the first projection 82 and a fifth projection 303 that comes into contact with the second projection 83 when the lid body is located at the closed position; and a fourth projection 302 that comes into contact with the first projection 82 and a sixth projection 304 that comes into contact with the second projection 83 when the lid body 50 is located at the opened position.

On the fixed rail 300, the third projection 301 is provided at the one end (the lower end in FIG. 12) in the movement direction (the vertical direction in FIG. 12) of the lid body 50. At the one end, the third projection 301 extends in the perpendicular direction (the horizontal direction in FIG. 12) to the movement direction. Part of the third projection 301 is arranged in a region where the first trajectory R1 is projected onto the fixed rail 300, that is, in the first projection region R3. Meanwhile, the third projection 301 is not arranged in a region where the second trajectory R2 is projected onto the fixed rail 300, that is, in the second projection region R4.

On the fixed rail 300, the fourth projection 302 is provided at a central portion in the movement direction. The fourth projection 302 extends in the orthogonal direction, and part thereof is arranged in the first projection region R3 while not being arranged in the second projection region R4.

On the fixed rail 300, the fifth projection 303 is provided at a central portion in the movement direction. The fifth projection 303 is arranged on the one end side from the fourth projection 302. The fifth projection 303 extends in the orthogonal direction, and part thereof is arranged in the second projection region R4 while not being arranged in the first projection region R3.

On the fixed rail 300, the sixth projection 304 is provided at the other end (an upper end in FIG. 12) in the movement direction. At the other end, the sixth projection 304 extends in the orthogonal direction. Part of the sixth projection 304 is arranged in the second projection region R4 while not being arranged in the first projection region R3.

Also, with such a configuration, the first projection 82 can be less likely to interfere with the fifth projection 303 and the sixth projection 304 at a time when the lid body 50 moves from the closed position to the opened position and the first projection 82 reaches a state of contacting the fourth projection 302 from a state of contacting the third projection 301. In addition, the second projection 83 can be less likely to interfere with the third projection 301 and the fourth projection 302 at a time when the lid body 50 moves from the closed position to the opened position and the second projection 83 reaches a state of contacting the sixth projection 304 from a state of contacting the fifth projection 303.

The slide mechanism that can suppress vertical rattling of the lid body 50 has been exemplified. However, the slide mechanism that can suppress horizontal rattling of the lid body 50 can also be adopted. For example, a configuration shown in FIG. 13 can be adopted.

Figure 13:
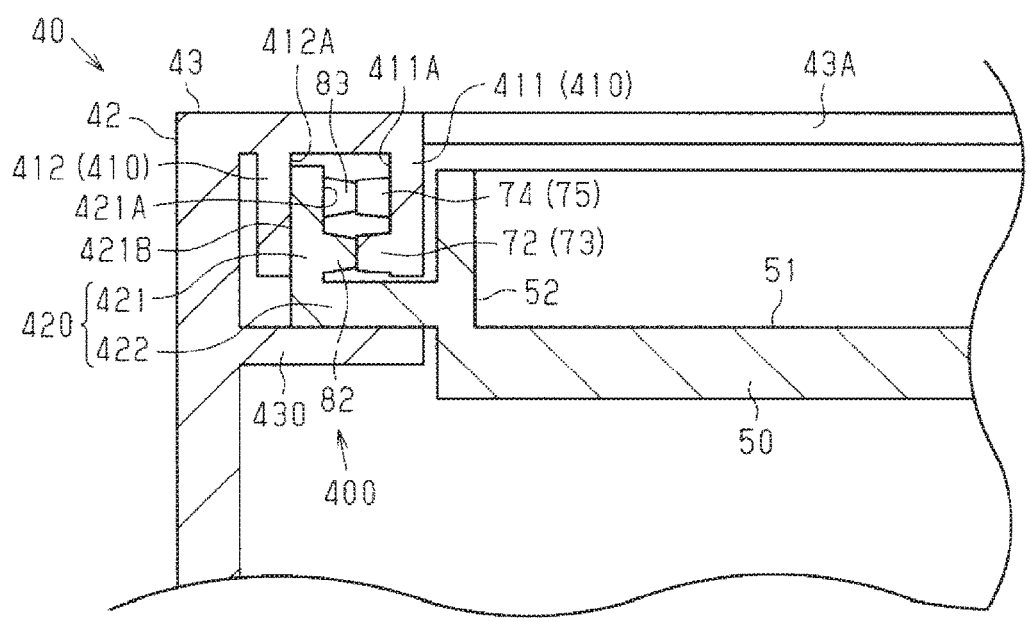
FIG. 13 is a cross-sectional view that schematically shows a configuration of another modified example of the slide mechanism.
Figure 14:
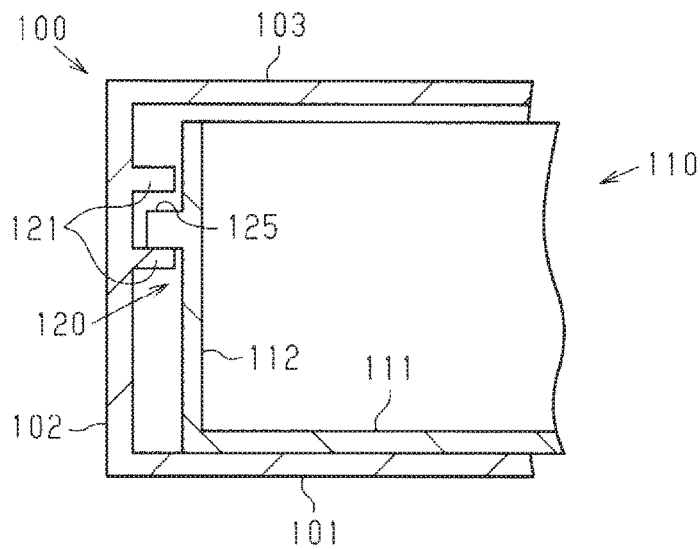
FIG. 14 is a cross-sectional view that schematically shows a configuration of a conventional storage box.
Figure 15:
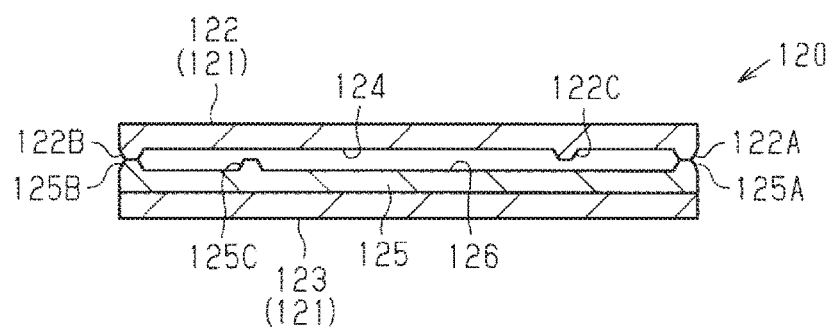
FIG. 15 is a cross-sectional view of a configuration of a sliding function in the conventional storage box and is a view of a state where a drawer section is arranged in a case.
Figure 16:
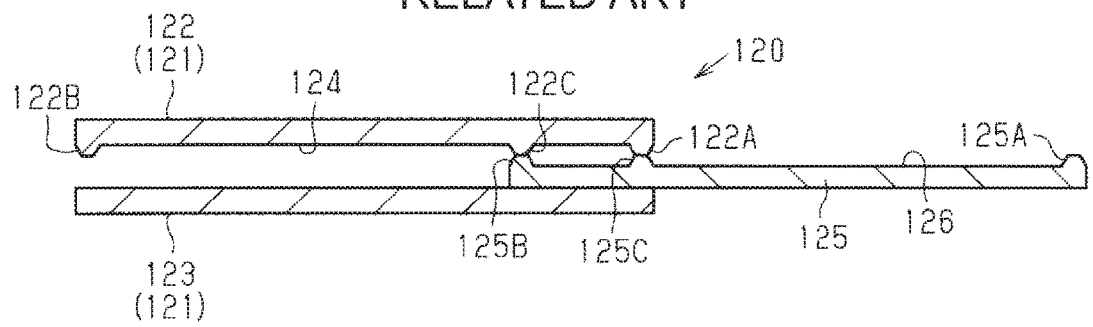
FIG. 16 is a cross-sectional view of the configuration of the sliding function in the conventional storage box and is a view of a state where the drawer section is slid out of the case.

As shown in FIG. 13, a slide mechanism 400 has: a fixed rail 410 that is disposed in the case 40; and a moving rail 420 that is disposed in the lid body 50. The fixed rail 410 is configured by including paired rails. One end of each of the paired rails is coupled to the upper wall 43 of the case 40, and the paired rails separate from each other in the horizontal direction. Of the paired rails, the rail that is arranged on the right side is referred to as a right rail 411, and the rail that is disposed on the left side is referred to as a left rail 412. On the upper wall 43 of the case 40, the fixed rail 410 continuously extends in a plate shape from one end in the movement direction of the lid body 50 (the depth direction in FIG. 13) to the other end in the movement direction.

On the peripheral wall 52 of the lid body 50, the moving rail 420 continuously extends from one end in the movement direction to the other end in the movement direction. The moving rail 420 has: an intermediate section 421 that is arranged between the right rail 411 and the left rail 412 of the fixed rail 410; and a sliding section 422 that is bent and extends from a lower end of the intermediate section 421 and is coupled to the outer peripheral surface of the peripheral wall 52 of the lid body 50.

The slide mechanism 400 has a support wall 430 that is projected from the inner peripheral surface of the lateral wall 42 of the case 40. On the lateral wall 42 of the case 40, the support wall 430 continuously extends from one end in the movement direction to the other end in the movement direction. The sliding section 422 of the moving rail 420 is placed on the support wall 430. A left surface 421B of the intermediate section 421 of the moving rail 420 is in contact with a right surface 412A of the left rail 412. Accordingly, along with the movement of the lid body 50, the sliding section 422 of the moving rail 420 slides with respect to the support wall 430, and the intermediate section 421 thereof slides with respect to the left rail 412. In this way, when the lid body 50 moves relative to the case 40, the relative movement of the lid body 50 is guided by the slide mechanism 400.

The intermediate section 421 of the moving rail 420 is provided with the first projection 82 and the second projection 83 that are projected rightward, that is, toward the right rail 411 from a right surface 421A thereof. The first projection 82 and the second projection 83 are arranged to be apart from each other in the movement direction of the lid body 50. As shown in FIG. 13, the first projection 82 and the second projection 83 are apart from each other in the orthogonal direction (the vertical direction in FIG. 13) to the movement direction of the lid body 50 when seen in the movement direction. Accordingly, when seen in the movement direction of the lid body 50 as shown in FIG. 13, the first projection 82 and the second projection 83 do not overlap each other. That is, the first trajectory as the relative movement trajectory of the first projection 82 to the fixed rail 410 and the second trajectory as the relative movement trajectory of the second projection 83 to the fixed rail 410 are apart from each other in the orthogonal direction (the vertical direction in FIG. 13) when seen in the movement direction of the lid body 50.

On a left surface 411A of the right rail 411, the third projection 72 and the fourth projection 73 are arranged in a projection region where the first trajectory R1 is projected onto the right surface 421A of the intermediate section 421 in the perpendicular direction, that is, a region of the right rail 411 where the third projection 72 and the fourth projection 73 overlap the first trajectory in the side view. In addition, on the left surface 411A of the right rail 411, the fifth projection 74 and the sixth projection 75 are arranged in a projection region where the second trajectory is projected onto the right surface 421A of the intermediate section 421 in the perpendicular direction, that is, a region of the right rail 411 where the fifth projection 74 and the sixth projection 75 overlap the second trajectory in the side view. When the lid body 50 is located at the closed position, the first projection 82 comes into contact with the third projection 72. When the lid body 50 is located at the opened position, the first projection 82 comes into contact with the fourth projection 73. In addition, when the lid body 50 is located at the closed position, the second projection 83 comes into contact with the fifth projection. When the lid body 50 is located at the opened position, the second projection 83 comes into contact with the sixth projection 75. According to such a configuration, in both of the cases where the lid body 50 is located at the closed position and the lid body 50 is located at the opened position, the moving rail 420, which is coupled to the lid body 50, is brought into an interposed state by the fixed rail 410, and horizontal rattling of the lid body 50 can be suppressed. In addition, it is possible to suppress the contact of the first projection 82 with the fifth projection 74 and the sixth projection 75 as well as the contact of the second projection 83 with the third projection 72 and the fourth projection 73 at the position between the closed position and the opened position when the lid body 50 moves. As a result, horizontal rattling of the lid body 50 at the time when the lid body 50 is arranged at the closed position or the opened position can be suppressed, and the lid body 50 can move smoothly.

In the above-described configurations, the examples in which the moving rail is provided with the first projection 82 and the second projection 83, and the fixed rail is respectively provided with the third projections 72, 301, the fourth projections 73, 302, the fifth projections 74, 303, and the sixth projections 75, 304 have been described. Instead of such configurations, the fixed rail may be provided with the first projection 82 and the second projection 83, and the moving rail may respectively be provided with the third projections 72, 301, the fourth projections 73, 302, the fifth projections 74, 303, and the sixth projections 75, 304. That is, in this configuration, a similar configuration to the configuration of the first projection 82 and the second projection 83 on the moving rail in the above embodiment can be applied to the first projection and the second projection that are provided on the fixed rail. Furthermore, a similar configuration to the configuration of the third projection 72, the fourth projection 73, the fifth projection 74, and the sixth projection 75 on the fixed rail in the above embodiment can be applied to the third projection, the fourth projection, the fifth projection, and the sixth projection that are provided on the moving rail.

The storage box 30 may not be provided with the holding mechanism 90. In this case, when the opening of the storage box 30 is closed, the lid body 50 may move from the opened position to the closed position manually. In the above embodiment, the example in which the lid body 50 moves between the closed position and the opened position has been described. However, an aspect of the movement of the lid body can be changed. For example, such a configuration that the lid body 50 moves between a half-opened position, at which the lid body 50 opens a half of the opening 43A, and a fully-opened position, at which the lid body 50 fully opens the opening 43A. In this case, the half-opened position corresponds to the first position, and the fully-opened position corresponds to the second position.

The moving body of the storage box 30 is not limited to the above-described lid body 50. For example, the moving body may be of a sliding type, one end of which can be slid out of the case. In the above embodiment, the example in which the paired slide mechanisms 60 are configured to be symmetrical has been described. However, these paired slide mechanisms 60 do not have to be symmetrical. For example, only one of the slide mechanisms 60 may be provided with each primary projection and each secondary projection.

The example in which the storage box is disposed in the center console 10 has been described. However, a similar configuration to that in the above embodiment can also be applied to a storage box that is provided in another interior member such as a dashboard.

What is claimed is:
1. A storage box comprising:
a case;
a moving body that moves relative to the case; and
slide mechanisms that guide relative movement of the moving body, wherein
each of the slide mechanisms includes a fixed rail that is disposed in the case, and a moving rail that is disposed in the moving body,
the moving rail is provided with a first projection and a second projection that are projected toward a corresponding one of the fixed rails and that are apart from each other in a movement direction of the moving body,
the first projection and the second projection are apart from each other when seen in the movement direction, and the fixed rail is provided with: a third projection and a fifth projection that are projected toward the moving rail and respectively come into contact with the first projection and the second projection at a time when the moving body is located at a first position; and a fourth projection and a sixth projection that respectively come into contact with the first projection and the second projection at a time when the moving body is located at a second position.

2. The storage box according to claim 1, wherein:
the third projection has a contact surface at a distal end in a projected direction that is configured to contact the first projection;
the fourth projection has a contact surface at a distal end in the projected direction that is configured to contact the first projection;
the first projection has a first distal surface at a distal end in the projected direction that is configured to contact the third projection and the fourth projection; and
each of the contact surface of the third projection and the contact surface of the fourth projection has a larger area than the first distal surface of the first projection, and wherein:
the fifth projection has a contact surface at a distal end in the projected direction that is configured to contact the second projection;
the sixth projection has a contact surface at a distal end in the projected direction that is configured to contact the second projection;
the second projection has a second distal surface at a distal end in the projected direction that is configured to contact the fifth projection and the sixth projection; and
each of the contact surface of the fifth projection and the contact surface of the sixth projection has a larger area than the second distal surface of the second projection.

3. The storage box according to claim 1, wherein:
in both of cases where the moving body is located at the first position and the moving body is located at the second position, the entire moving rail in the movement direction opposes the fixed rail;
the first projection is arranged at one end in the movement direction of the moving rail; and
the second projection is arranged at the other end in the movement direction of the moving rail.

4. The storage box according to claim 1, wherein each of the first projection and the second projection has a truncated polygonal pyramid shape or a truncated cone shape, a cross-sectional area of which is reduced toward a distal end in a projected direction.

5. The storage box according to claim 1, wherein each of the third projection, the fourth projection, the fifth projection, and the sixth projection has the truncated polygonal pyramid shape or the truncated cone shape, the cross-sectional area of which is reduced toward the distal end in a projected direction.

6. A storage box comprising:
a case;
a moving body that moves relative to the case; and
slide mechanisms that guide relative movement of the moving body, wherein:
each of the slide mechanisms includes a fixed rail that is disposed in the case, and a moving rail that is disposed in the moving body;
the fixed rail is provided with a first projection and a second projection that are projected toward the moving rail and that are apart from each other in a movement direction of the moving body;

the first projection and the second projection are apart from each other when seen in the movement direction; and the moving rail is provided with: a third projection and a fifth projection that are projected toward the fixed rail and respectively come into contact with the first projection and the second projection at a time when the moving body is located at a first position; and a fourth projection and a sixth projection that respectively come into contact with the first projection and the second projection at a time when the moving body is located at a second position.

7. The storage box according to claim 6, wherein each of the first projection and the second projection has a truncated polygonal pyramid shape or a truncated cone shape, a cross-sectional area of which is reduced toward a distal end in a projected direction.

8. The storage box according to claim 6, wherein each of the third projection, the fourth projection, the fifth projection, and the sixth projection has a truncated polygonal pyramid shape or a truncated cone shape, a cross-sectional area of which is reduced toward a distal end in a projected direction.

* * * * *